United States Patent

Johnston et al.

[11] Patent Number: 5,852,806
[45] Date of Patent: Dec. 22, 1998

[54] SWITCHED FILTERBANK FOR USE IN AUDIO SIGNAL CODING

[75] Inventors: James David Johnston, Warren; Deepen Sinha, Chatham, both of N.J.

[73] Assignee: Lucent Technologies Inc., Murray Hill, N.J.

[21] Appl. No.: 720,757

[22] Filed: Oct. 1, 1996

Related U.S. Application Data

[60] Provisional application No. 60/014,725 Mar. 19, 1996.
[51] Int. Cl.$^6$ .............................. G10L 9/00; H04H 5/00
[52] U.S. Cl. ........................................... 704/500; 704/230
[58] Field of Search ..................................... 704/500, 230

[56] References Cited

U.S. PATENT DOCUMENTS

| | | | |
|---|---|---|---|
| 5,381,143 | 1/1995 | Shimoyoshi et al. | 704/500 |
| 5,481,614 | 1/1996 | Johnston | 704/500 |

*Primary Examiner*—David R. Hudspeth
*Assistant Examiner*—Susan Wieland
*Attorney, Agent, or Firm*—Donald P. Dinella

[57] ABSTRACT

An audio coding technique which utilizes a signal adaptive switched filterbank having a first filterbank and a wavelet filterbank. The filterbank switches between the first filterbank and the wavelet filterbank to filter an input signal as a function of the stationarity of the input signal. The first filterbank is utilized to filter stationary signal components. The wavelet filterbank is utilized to filter non-stationary signal components (e.g., attacks).

20 Claims, 3 Drawing Sheets

SWITCHED FILTERBANK FOR USE IN AUDIO SIGNAL CODING

CROSS REFERENCE TO PROVISIONAL APPLICATION

This application claims the benefit of U.S. Provisional Application No. 60/014,725, filed on Mar. 19, 1996.

FIELD OF THE INVENTION

The present invention relates to the processing of signals and, more particularly, to the encoding of audio signals using subband coding schemes, for example, perceptual audio coding.

BACKGROUND OF THE INVENTION

Consumer, industrial, studio and laboratory products for storing, processing and communicating high quality audio signals are in great demand. The compression of audio signals at very low bit rates is highly desirable for a number of emerging digital audio applications such as digital audio tape, compact discs and multimedia applications. The compression techniques employed in these digital applications are capable of processing high quality signals. However, such performance is often achieved at the expense of considerable data storage capacity or transmission bandwidth.

A considerable amount of work in the compression area has sought to reduce the data storage and transmission bandwidth requirements in the coding of digital audio. One such compression technique eliminates the irrelevant information in source signals by using a model of the human perceptual system. This perceptual audio coding (hereinafter "PAC") technique is described in, for example, U.S. Pat. No. 5,285,498, entitled "Method and Apparatus for Coding Audio Signals Based on Perceptual Model", issued on Feb. 8, 1994, to J. D. Johnston and hereby incorporated by reference (hereinafter referred to as the "Johnston" patent).

Perceptual audio coding, as described for example, in the Johnston patent, is a technique for lowering the bitrates or total number of bits required in representing audio signals. The PAC technique makes use of a short-term energy distribution as a function of frequency. From this energy distribution, it is known that a set of thresholds, representing just noticeable noise levels, can be calculated. Then, inter alia, the coarseness of quantizing used to represent a signal component of the desired signal is selected such that the quantizing noise introduced by the coding itself does not rise above the noise thresholds. The introduced noise is therefore masked in the perception process. The masking occurs because of the inability of the human perceptive mechanism to distinguish between two signal components (one belonging to the signal and one belonging to the noise) in the same spectral, temporal or spatial locality.

Recently, a number of perceptual audio coders have been developed which claim to provide transparent compression in the range of 128–256 kbps (i.e., compression factors in the 6–12 range). Typically, such coders employ analysis filterbanks which divide the input signal into its frequency components. These components are then quantized using a perceptual model, as described above, which is based on the masking characteristics of human hearing. In the Johnston patent, for example, a PAC approach is described which employs a high frequency resolution filterbank known as the Modified Discrete Cosine Transform (hereinafter "MDCT") filterbank to divide the signal into the frequency components. This high frequency resolution MDCT filterbank (e.g., having 1024 subbands or frequency lines) leads to a very compact representation for so-called stationary signals (e.g., instrumental music and most vocal music). However, so-called non-stationary audio signals that contain transients or sharp attacks (e.g., castanets or triangles) cannot be represented compactly using the high frequency resolution MDCT filterbank. This is due to the higher time resolution required at higher frequencies for compact representations. In addition, using the MDCT for non-stationary signal components leads to poor quality of the coded signal.

Other techniques have been developed which address the filtering problem encountered when coding non-stationary signals. For example, one such technique described in the Johnston patent, employs a so-called "window switching" scheme. This PAC scheme uses so-called "long" and "short" MDCT windows to address the sharp attacks of non-stationary signals. In "window switching", the stationarity of the signal is monitored at two levels. First, long MDCT windows (e.g., a window having 1024 subbands) are used for stationary signal components, then if necessary, short windows (e.g., a window having 128 subbands) are used during periods of non-stationarity. However, a disadvantage of this approach is that the short MDCT windows increase the time resolution uniformly for all frequencies. In other words, in order to increase the time resolution to the desired extent at higher frequencies, this technique must also increase the time resolution at lower frequencies as well.

A more desirable filterbank for filtering sharp attacks is one which has a non-uniform structure having subbands that match the critical band division of the frequency axis (i.e., the subbands are uniform on the bark scale). Moreover, it is highly desirable that the high frequency filters of the filterbank be proportionately shorter. One coding scheme which meets these objectives utilizes a hybrid or cascade structure (see, for example, K. Brandenburg et al., "The ISO-MPEG-Audio Codec: A Generic Standard for Coding of High Quality Digital Audio", Journal of Audio Engineering Society, Vol. 42, No. 10, Oct., 1994, and J. Princen and J. D. Johnston, "Audio Coding with Signal Adaptive Filterbanks", In proceedings of IEEE, ICASSP, Detroit, 1995.) This coding technique consists of a first stage having a uniform or non-uniform filterbank. Each of the subbands may be further split using uniform filterbanks. However, a disadvantage of this approach, in comparison with MDCT filterbanks, is that the hybrid/cascade structure must be used for both stationary and non-stationary signals which leads to poorer frequency response of the filters as well as increased implementation costs.

There is a need in the art, therefore, for a filterbank which overcomes the disadvantages of the prior art filtering arrangements for handling non-stationary signals in subband coding.

SUMMARY OF THE INVENTION

A signal compression technique embodying the principles of the invention switches between a first filterbank and a wavelet filterbank for coding audio signals using perceptual audio coding or similar subband-type coding.

In preferred embodiments, switching between the two filterbanks is based upon the time-varying characteristics of the signal, preferably its perceptual entropy level. Also, in the preferred embodiments, the first filterbank is a high frequency resolution MDCT filterbank. Normally, the high frequency resolution MDCT filterbank is used to filter the input signal but in the event of non-stationarity the wavelet filterbank is used. Advantageously, the present invention achieves a more compact representation of the signal when it contains non-stationary components. In accordance with the preferred embodiment, the wavelet filterbank is non-uniform tree-structured filterbank.

DETAILED DESCRIPTION

The invention is directed to an audio signal compression technique employing a signal adaptive switched filterbank that switches between a first filterbank (preferably a high frequency resolution MDCT filterbank) and a wavelet filterbank for handling non-stationary signals coded using perceptual audio coding or similar subband-type coding.

Illustrative embodiments of the present invention are presented in functional blocks for clarity of explanation. The functions that these blocks represent may be provided through the use of either shared or dedicated hardware, including, but not limited to, hardware capable of executing software. Furthermore, the use of the term "processor" should not be construed to refer exclusively to hardware that is capable of executing software. Some embodiments may comprise digital signal processor (hereinafter "DSP") hardware such as the AT&T DSP16 or DSP32 and software for performing the operations discussed below. Very large scale integration (hereinafter "VLSI") hardware embodiments of the present invention, as well as hybrid DSP/VLSI embodiments, may also be provided.

Figure 1:
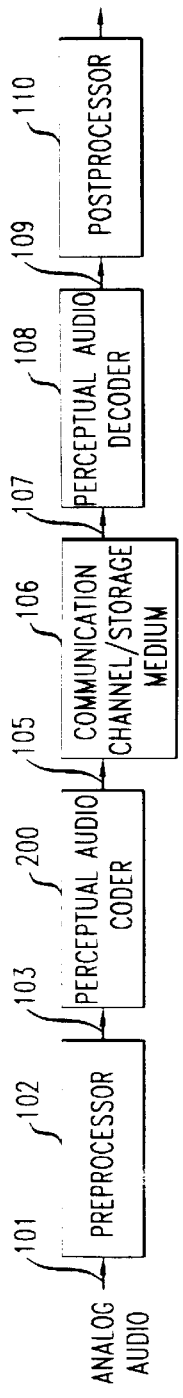
FIG. 1 is a block diagram of a system in which the present invention is illustratively implemented.

FIG. 1 is a an overall block diagram of an illustrative system in which the present invention is implemented. In FIG. 1, an analog audio signal 101 is provided to preprocessor 102 where it is sampled (typically at 48 kHz) and converted into a 16 bit-per-sample digital pulse code modulation (hereinafter "PCM") on lead 103 in a conventional manner. The PCM signal is fed into a perceptual audio coder 200 which compresses the PCM signal and outputs the compressed PAC signal on lead 105 to either a communications channel or storage medium 106. The later may be, for example, a magnetic tape, compact disc or other storage medium. From the communications channel or the storage medium the compressed PAC-encoded signal on lead 107 is fed into a perceptual audio decoder 108 which decompresses the compressed PAC-encoded signal and outputs a PCM signal on lead 109 which is a digital representation of the original audio signal 101. From the perceptual audio decoder, the PCM signal on lead 108 is fed into a post-processor 110 which creates an analog representation of the signal.

Figure 2:
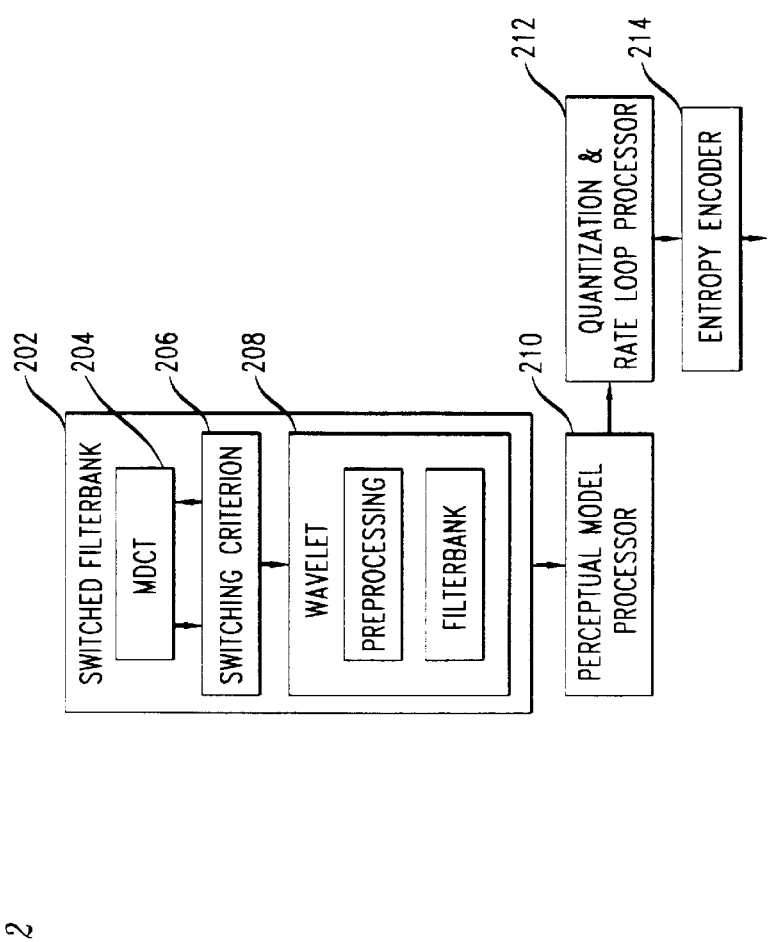
FIG. 2 is a block diagram of an illustrative perceptual audio coder used in the system of FIG. 1 employing the signal adaptive switched filterbank of the present invention.

An illustrative embodiment of perceptual audio coder 200 is shown in block diagram form in FIG. 2. The perceptual audio coder 200 may advantageously be viewed as comprising a signal adaptive switched filterbank 202, a perceptual model processor 210, a quantizer/rate loop processor 212 and an entropy coder 214. The structure and operation of perceptual model processor 210, quantizer/rate loop processor 212 and entropy coder 214 are generally similar to the structure and operation of like components found in the Johnston patent for processing audio signals, and thus will not be described in detail herein except as necessary to the present invention. However, signal adaptive switched filterbank 202 will now be discussed in detail regarding the switching between a first filterbank (preferably a high frequency resolution MDCT filterbank) and wavelet filterbank. It is the characteristics of switched filterbank 202, in combination with the other elements of FIG. 2, which provide the advantages of the present invention.

Turning, then, to FIG. 2, signal adaptive switched filterbank 202 illustratively contains a high frequency resolution MDCT filterbank 204 and a wavelet filterbank 208 for use in switching 206 between the two filterbanks during the encoding of the signal in a predetermined fashion as will be discussed herein. As discussed previously, employing a high frequency resolution MDCT (e.g., 1024 subband or frequency lines in PAC) in the encoding process is useful in that the MDCT leads to a very compact representation for stationary signals. For PAC purposes, MDCT offers features which include: (i) critical sampling characteristics (i.e., for every n samples into the filterbank, n samples are obtained); (ii) the MDCT typically provides half-overlap (i.e., the transform length is exactly twice the length of the number of samples n, shifted into the filterbank) which provides a good method of dealing with the control of noise injected independently into the filterbank; and (iii) MDCT provides an exact reconstruction of the input samples, subject only to a delay of an integral number of samples. The well-known MDCT is described, e.g., in J. P. Princen and A. B. Bradley, "Analysis/Synthesis Filter Bank Design Based on Time Domain Aliasing Cancellation," IEEE Trans. ASSP, Vol. 34, No. 5, Oct. 1986. The well-known adaptation of the MDCT for use in PAC and the functionality that is performed by the high frequency resolution MDCT filterbank 204 herein is fully described in e.g., the Johnston patent.

However, although the high frequency resolution MDCT 204 filterbank is very efficient for use in representing stationary signals, as mentioned previously, the MDCT filterbank does not provide a compact representation of non-stationary signals (i.e., signals that contain transients or sharp attacks). We have realized, however, a technique which builds on the advantages of using the high frequency resolution MDCT filterbank 204 while improving the audio compression characteristics of audio coder 200.

Thus, in accordance with the present invention, signal adaptive switched filterbank 202 employs both high frequency resolution MDCT filterbank 204 and wavelet filterbank 208 to encode, for example, audio signal 101. In accordance with the preferred embodiment, high frequency resolution MDCT filterbank 204 employs a high frequency resolution MDCT for encoding purposes. That is, filterbank 204 employs only so-called long windows (i.e., 1024 subbands) and does not "switch" to so-called short windows (i.e., 128 subbands as opposed to 1024 subbands) when a non-stationary signal is encountered. This, of course, is the prior art window switching technique referred to previously, and described in the Johnston patent. In accordance with the present invention, rather than switching to a short MDCT window, switched filterbank 202 uses wavelet filterbank 208 during such periods of non-stationarity.

More particularly, wavelet filterbank 208 employs a wavelet transform for effectively filtering an input signal having non-stationary components. A wavelet is a function which provides a complete orthogonal basis for the space of finite energy signals through its various translation and dilation characteristics. The general coding of audio signals using an optimized wavelet transform is discussed in, for example, D. Sinha and A. H. Tewfik, "Low Bit Rate Transparent Audio Compression using Adapted Wavelets," IEEE Transactions on Signal Processing, Vol. 41, No. 12, PP. 3463–3479, Dec. 1993. In accordance with the embodiment of the present invention, we have adapted the wavelet transform for use with the psychoacoustic model upon which PAC is based and use certain frequency and temporal characteristics as the primary criterion in the design of the illustrative wavelet filterbank herein.

It is well-known that the time-frequency resolution of the psychoacoustic analysis should match the time-frequency resolution of the auditory system. These resolution characteristics are reflected in the critical band scale, which indicates that the frequency resolution in the psychoacoustic model should vary from 100 Hz at low frequencies, to approximately 4 kHz at high frequencies (i.e., a 40:1 change in resolution). This suggests that the temporal resolution in a PAC coder should increase by a factor of approximately 40:1 from low to high frequencies. It is known that most psychoacoustic models use a very low uniform temporal resolution. A lack of temporal resolution at high frequencies has little effect on the thresholds calculated for stationary signals. However, the thresholds calculated for non-stationary signals will be inaccurate and may lead to audible distortions. This behavior can be corrected by employing the signal adaptive switched filterbank of the present invention.

Use of the signal adaptive switched filterbank of the present invention offers several advantages over prior techniques for the coding of non-stationary signal segments or transients. For example, it leads to a more compact representation of non-stationary signal components. It also leads to more accurate psychoacoustic modeling during the non-stationary segments of the signal. These features translate into significant savings in the overall bit rate requirement for representing the transient. In addition, the use of our signal adaptive switched filterbank preserves the well-known performance advantages of the high frequency resolution MDCT filterbank for compression of stationary signal segments.

More particularly, in accordance with the preferred embodiment of the present invention, a tree-structured wavelet filterbank is used. As discussed above, it is important to the accuracy of the psychoacoustic model that the frequency split used closely approximates the critical bank division of the frequency axis. The wavelet filterbank provides good frequency selectivity (i.e., a small overlap between the frequency response of adjacent subbands). In addition, the wavelet filterbank provides good temporal characteristics where the impulse response of higher frequency subbands decay rapidly (also known as compactly localized). Higher frequency subbands which are compactly localized lead to the efficient representation of non-stationary signal segments. The tree-structure used in the preferred embodiment of the present invention aids in providing these aforementioned desired wavelet filterbank characteristics. This tree-structure offers the advantage that filters for higher frequency subbands are proportionately shorter because the critical bands are wider at higher frequency thereby requiring fewer stages in the overall tree-structure to achieve the desired frequency resolution. Further, control of the temporal characteristics of the tree-structured filterbank is provided by the use of a moment condition. The moment condition and its use is discussed below. To ensure that the tree-structure matches the critical band division closely, the tree-structured wavelet filterbank of the preferred embodiment employs three sets of filterbanks. One set of filterbanks provide a four-subband split while the other two sets each provide a two-subband split as will be further discussed below.

Figure 3:
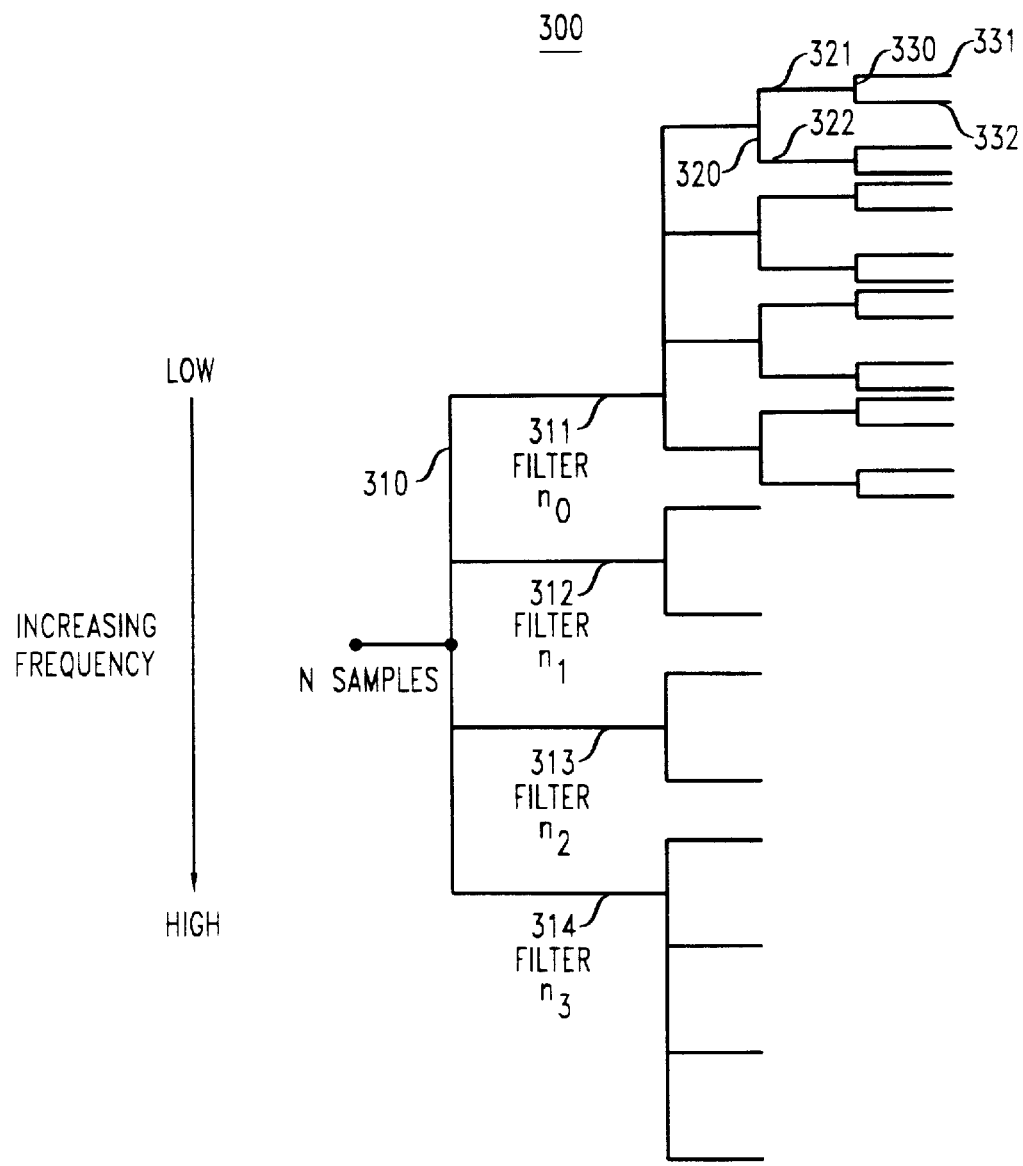
FIG. 3 illustrates a tree-structured wavelet filterbank used in the signal adaptive switched filterbank of FIG. 2.

FIG. 3 shows an illustrative decomposition tree 300 for the tree-structured wavelet filterbank used in switched filterbank 202. In accordance with the preferred embodiment, the three sets of filterbanks used in the illustrative tree-structure of wavelet filterbank 208 provide sufficient design flexibility to ensure that the tree-structure closely approximates the critical band partition. In particular, the first filterbank set 310 provides a four-band split (i.e., 311–314) of the signal. Illustratively, this four-band filter split increases in frequency from filter 311 to 314 and each filter has a support (length) of 64. Again illustratively, a second filterbank 320 provides a two-band split (i.e., 321 and 322) having a support of 40, while a third filterbank 330 also provides a two-band split (i.e., 331 and 332) having a support of 20. As will be appreciated by those skilled in the art, the application of filterbank 310 at any node of decomposition tree 300 entails a decimation by a factor of 4. Similarly, application of filterbank 320 and 330 each entail a decimation by a factor of 2. illustratively, with an input block of N samples, subband 331 has N/64 filtered samples while subband 322 has N/4 filtered samples. The three filterbanks employed by wavelet filterbank 208 are optimized using, for example, well-known parameterized paraunity filterbanks and applying standard optimization tools. Optimization criterion used for optimizing wavelet filterbank 208 is based on the well-known weighted stopband energy criterion (see, for example, P. P. Vaidyanathan, "Multirate Digital Filters, Filterbanks, Polyphase Networks, and Applications: A Tutorial," Proceedings of the IEEE, Vol. 78, No. 1, pp. 56–92, January 1990). The optimization provided by the above-described tree-structured filterbank ensures that each of the three filterbanks as well as the overall filterbank itself provide good frequency selectivity.

In the preferred embodiment, the moment condition plays an important role in achieving the desirable temporal characteristics of the high frequency filters (i.e., filters corresponding to subbands in decomposition tree 300 which contain higher frequencies). The moment condition determines the smoothness (i.e., order of differentiability) of the higher subband frequency responses closer to the center frequency. As will be seen below, this greater smoothness close to the center frequency leads to a corresponding impulse response which is compactly localized. More particularly, an M band paraunitary filterbank with subband filters $\{H_i\}_{i=1 \ to \ M}$ is said to satisfy a $P^{th}$ order moment condition if $H_i(e^{i\omega})$ for i=2, 3, . . . M has a $P^{th}$ order zero at $\omega$=0. The filters are then said to have P vanishing moments. In the illustrative wavelet filterbank 208 design, for a given support K for the filters requiring P>1 yields filters for which the "effective" support reduces the increasing P. In other words, most of the energy is concentrated in a interval K' where K' is smaller for higher P.

Figure 4:
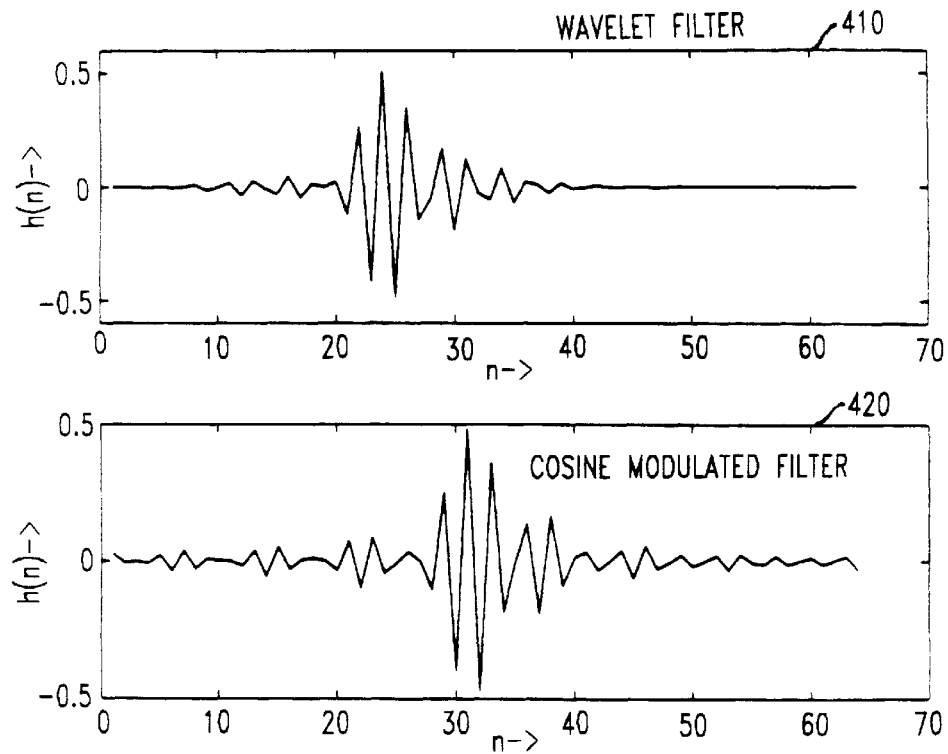
FIG. 4 illustrates a comparison between a cosine-modulated filter and the wavelet filter used in the signal adaptive switched filterbank of FIG. 2.

It is well-known that improvement in the temporal response of the filters is typically at the cost of an increased transition band in the amplitude frequency response. (see for example, P. Vaidyanathan, "Multirate Digital Filters, FilterBanks, Polyphase Networks, and Applications: A Tutorial," Proceedings of the IEEE, Vol. 78, No. 1, pp. 56–92, January, 1990.) The tree-structured filterbank preferably has two vanishing moments (i.e., P=2) for each of the three sets of filterbanks to achieve the desired localization in the temporal characteristics of the filters. For example, the impulse response 410 of the highest frequency subband of wavelet filterbank 208 (e.g., subband 314 shown in FIG. 3) is illustrated in FIG. 4 along with, for comparison purposes, the response 420 of a filter from a cosine modulated filterbank with similar frequency characteristics. As can be seen, the response 410 from the wavelet filterbank constructed, in accordance the preferred embodiment, offers superior localization in time as evidenced by the impulse response 410 of the high frequency wavelet filter 314. The high frequency wavelet filter 314 has most of its energy concentrated between n=10 to n=40. In comparison, the response 420 of cosine modulated filterbank has energy spread over the entire range n=1 to n=64.

In accordance with the principles of the invention, high frequency resolution MDCT filterbank 204 is used for coding stationary signals and wavelet filterbank 208 for coding non-stationary signals. Critical to the effectiveness of employing the two filterbanks is a mechanism for switching between them based upon specific signal requirements (i.e., stationary vs. non-stationary). To that end, one must realize that the MDCT is an overlapped orthogonal transform. That is, unlike a conventional block transform, there is a fifty percent overlap between adjacent blocks. Therefore, switching between high frequency resolution MDCT filterbank 204 and wavelet filterbank 208 requires orthogonalization in the overlap region between an MDCT block and wavelet block. While it is well-known how to design a general orthogonalization problem (see for example, C. Herley et al., "Tiling of the Time-Frequency Plane: Construction of Arbitrary Orthogonal Bases and Fast Tiling Algorithm, IEEE Transactions on Signal Processing, Vol. 41, No. 12, Dec., 1993) the disadvantage in such a design is that the resulting transform matrix is inefficient from an implementation standpoint. That is, the lack of any in the resulting filters makes the fast computation of the wavelet transform very difficult.

Thus, a simplification can be realized in the orthogonalization algorithm by noting that the MDCT operation over a block of 2N samples is equivalent to a symmetry operation in the windowed data (i.e., the outer N/2 samples from either end of a window are folded into the inner N/2 samples of the window), followed by a N point orthogonal block transform Q over these N samples. Perfect reconstruction of the signal is ensured irrespective of a particular block orthogonal transform Q. Thus, Q may be a MDCT for one block and a wavelet transform for a subsequent block. The matrix Q corresponding to the MDCT is well-known and will not be discussed further. The matrix Q employed by wavelet filterbank 208 will now be discussed. When using the wavelet transform, the orthogonal matrix Q filterbank (hereinafter referred to as $Q^{WFB}$) is a N×N matrix based upon the three filterbanks of the aforementioned tree-structured wavelet. This matrix $Q^{WFB}$ consists of several blocks with each block corresponding to the leaf nodes (i.e., subbands) in the decomposition tree 300 of FIG. 3. As will be appreciated by those skilled in the art, the matrix for the decomposition tree 300 is fully identified by filters in the three filterbanks 310, 320 and 330, and a strategy for handling finite block size (i.e., boundary conditions). For clarity of explanation, we will now describe the handling of boundary conditions, in the preferred embodiment, in the context of the four-band split 310 of decomposition tree 300 shown in FIG. 3. The extension thereafter to the full tree-structure will be apparent to one skilled in the art.

For the four-band split 310 shown in FIG. 3, the corresponding transform matrix Q consists of four subblocks of size N/4×N with one subblock corresponding to each of the filters 311, 312, 313 and 314 respectively. Illustratively, we define the length of these filters as K and further define another constant $K_1=(K/4)-1$. For each of the four subblocks, all but N/4−K, rows of the subblock, correspond to the respective subband filter itself (e.g., 311) and the $(N/4-K_1-1)$ translates of that subband filter. To avoid circular convolutions, the remaining $K_1$ rows of the subblock are transition filters designed to operate close to the edge of the block. These transition filters are preferably designed using a basis completion strategy. More particularly, a Q1, Q2, Q3 and Q4 are defined as $K_1=N$ matrices corresponding to the unidentified rows of the four subbands. Next, Q1 through Q4 are chosen such that collectively these matrices form an orthogonal basis for a subspace which itself is orthogonal to the previously defined $4\times(N/4-K_1)$ rows of Q. Further, Q1 through Q4 are chosen to maximize a cost function having the form: Cost=Trace(Q1W'$D_1$WQ1'+ Q2W'$D_2$WQ2'+Q3W'$D_3$WQ3'+Q4W'$D_4$WQ4'), where W is an N×N Fourier Transform matrix and $D_1$ through $D_4$ are diagonal matrices having N/4 of N diagonal elements being non-zero and equal to 1. The N/4 non-zero elements for a particular subband correspond to a particular subband's location on the frequency axis. As will be appreciated by those skilled in the art, this is a subspace-constrained optimization problem which may be solved, for example, by using standard optimization tools. For each of the subbands, the transition filters are arranged in $Q^{WFB}$ in order of increased group delay so that the subband coefficients have accurate temporal interpretation.

Figure 5:
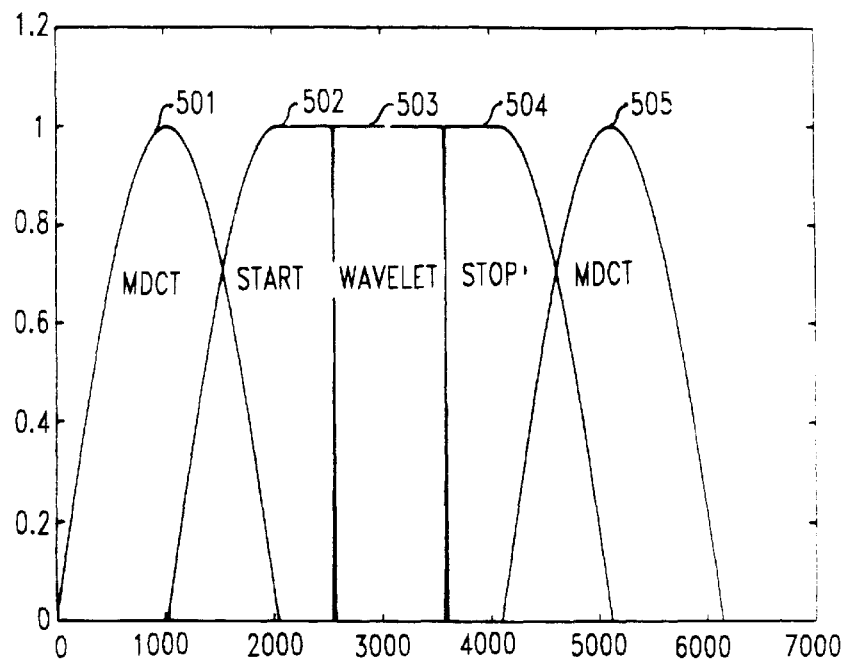
FIG. 5 is an illustrative filterbank switching sequence generated using the signal adaptive switched filterbank of FIG. 2.

We have also recognized that the above-described orthogonalization approach may have the effect of extending the wavelet filter in time and/or introducing discontinuities in the wavelet filter itself. Any such possible impairment of wavelet filterbank 208 may be mitigated by the following: (i) transitory START and STOP windows (as described in, for example, the Johnston patent) are employed as a transition between the use of high frequency resolution MDCT filterbank 204 and wavelet filterbank 208; and (ii) reducing the effective overlap between the transition window and wavelet window by applying a family of so-called smooth windows. An illustrative switching sequence between high frequency resolution MDCT filterbank 204 and wavelet filterbank 208 employing the aforementioned technique is shown in FIG. 5. As seen in FIG. 5, START window 502 is used in the transition between high frequency resolution MDCT filterbank window 501 and wavelet filterbank window 503. Further, a STOP window 504 is used in the transition between wavelet filterbank window 503 and high frequency resolution MDCT filterbank window 505.

The so-called smooth windows are used in the overlap region between START window 502 and wavelet window 503, and again between the overlap region between wavelet window 503 and STOP window 504. These smooth windows are useful as a baseband filter and are compactly localized in time (i.e., most of the energy in the window is concentrated around the center). The smooth windows are generated using the equation: $h(n)=h(t)|_{t=(n+\frac{1}{2})(1/N)}$, $n=0, 1 \ldots N-1$, where h(t) is non-zero on the interval [0,1] and zero outside.

Turning again to FIG. 2, perceptual model processor 210 uses a psychoacoustic analysis to calculate an estimate of the perceptual importance and noise masking properties of the various signal components in switched analysis filterbank 202. The psychoacoustic analysis taking place in processor 210 is well-known and described in, for example, the Johnston patent and in J. D. Johnston, "Transform Coding of Audio Signals Using Perceptual Noise Criteria," IEEE Journal on Selected Areas in Communication," Vol. 6, pp. 319–323, February, 1988. While the thresholds for the quantization of coefficients in the MDCT block are directly obtained in a known manner from the psychoacoustic analysis, the thresholds used by the wavelet block require additional processing.

The thresholds for the quantization of wavelet coefficients is based on an estimate of time-varying spread energy in each of the subbands and an estimated tonality measure as in PAC. The spread energy is computed by considering the spread of masking across frequency as well as time. In other words, inter-frequency as well as a temporal spreading function is employed. The shape of these spreading functions is derived, for example, from chochlear filters as described in J. B. Allen, "The ASA edition of Speech Hearing in Communications," Acoustical Society of America, New York, 1995. The temporal spread of masking is frequency dependent and determined approximately by the inverse of the bandwidth of the chochlear filter at a particular frequency. A fixed temporal spreading function is preferably used for a range of frequencies or subbands. Thus, the shape of the spreading function becomes increasingly narrower at higher frequencies. The coefficients in a subband are grouped within a coderband and one threshold value per coderband is used during quantization. Illustratively, the coderband span ranges from 10 msec in the lowest frequency subband to approximately 2.5 msec in the highest frequency subband.

Quantization/rate loop processor 212, again as described in Johnston, takes the outputs from switched analysis filterbank 202 and perceptual model processor 210, and allocates bits, noise, and controls other system parameters so as to meet the required bit rate for the given application. Entropy coder 214 is used to achieve a further noiseless compression in cooperation with rate loop processor 212. As described, for example in the Johnston patent, entropy coder 214 receives a quantized audio signal output from quantization/rate loop processor 212. Entropy coder 214 then performs a lossless encoding on the quantized audio signal using, for example, the well-known minimum-redundancy Huffman coding technique. Huffman codes are described, e.g., in D. A. Huffman, "A Method for the Construction of Minimum Redundancy Codes," Proc. IRE, 40:1090–1101, 1952, and T. M. Cover and J. A. Thomas, "Elements of Information Theory," pp. 92–101, 1991. Further, the Johnston patent describes the use of Huffman coding in the PAC context of entropy coder 214. Those skilled in the art will readily perceive how to implement alternative embodiments of entropy coder 214 using other noiseless data compression techniques, including the well-known Lempel-Ziv compression methods.

Finally, a switching criterion 206 is employed to further facilitate the effective switching between high frequency resolution MDCT filterbank 204 and wavelet filterbank 208. To be effective, the criterion must detect attacks accurately without any false alarms or missed attacks. For example, an undetected attack, if encoded using high frequency resolution MDCT filterbank 204 will result in a perceptible distortion of the signal especially at low bit rates. In contrast, coding a relatively stationary signal with wavelet filterbank 208 results in a significant waste of output bits and processing power. Thus, in accordance with the preferred embodiment, a perceptual entropy criterion is employed. As discussed previously, perceptual entropy is a measure of a particular transform segment of a signal which provides a theoretical lower bound of bits-per-sample to transparently code that segment. A significant increase in perceptual entropy from one segment to the next is a good indication of a strong non-stationarity of the signal (e.g., an attack). In accordance with the embodiment of FIG. 2, this type of perceptual entropy change is used by coder 202 to trigger the switching 206 from high frequency resolution MDCT filterbank 204 to wavelet filterbank 208. Illustratively, a decision is made by coder 202 once every 25 msec. regarding switching between high frequency resolution MDCT filterbank 204 and wavelet filterbank 208.

Finally, the foregoing merely illustrates the principles of the present invention. Those skilled in the art will be able to devise numerous alternative arrangements which, although not explicitly shown or described herein, embody those principles and are thus within the spirit and scope of the invention as defined in the appended claims.

We claim:

1. A method for encoding an audio signal, said method comprising the steps of:

sampling said audio signal;

alternatively filtering said sampled audio signal by switching between a first filterbank and a wavelet filterbank to produce a filtered signal, said wavelet filterbank being a tree-structured non-uniform filterbank, said first filterbank being independent from said wavelet filterbank, and said switching occurring in response to the stationarity of said audio signal; and encoding said filtered signal to provide a compressed output signal.

2. The method of claim 1 wherein said first filterbank is a high frequency resolution MDCT filterbank.

3. The method of claim 2 wherein said wavelet filterbank employs a plurality of moment conditions for differentiating a frequency response within said non-uniform filterbank.

4. The method of claim 2 wherein in said filtering step said high frequency resolution MDCT filterbank is employed to filter stationary components of said audio signal, and said wavelet filterbank is employed to filter non-stationary components of said audio signal.

5. The method of claim 1 wherein said encoding step includes perceptual audio coding.

6. A method of encoding an audio signal, said method comprising the steps of:

generating a plurality of noise threshold values as a function of the frequency characteristics of said audio signal;

alternatively filtering said audio signal by switching between a first filterbank and a wavelet filterbank to produce a filtered signal, said wavelet filterbank being a tree-structured non-uniform filterbank, said first filterbank being independent from said wavelet filterbank, and said switching occurring in response to the stationarity of said audio signal;

quantizing said filtered signal, the coarseness of said quantizing being determined by said noise threshold values; and perceptually encoding said quantized signal.

7. The method of claim 6 wherein said first filterbank is a high frequency resolution MDCT filterbank.

8. The method of claim 7 wherein said wavelet filterbank employs a plurality of moment conditions for differentiating a frequency response within said non-uniform filterbank.

9. The method of claim 8 wherein said stationarity of said audio signal is determined using perceptual entropy.

10. The method of claim 9 wherein a first one of said non-uniform filterbanks of said set provides a four-band split of said audio signal and a second one of said non-uniform filterbanks provides a two-band split of said signal.

11. The method of claim 7 wherein in said filtering step said high resolution MDCT filterbank is employed to filter stationary components of said audio signal, and said wavelet filterbank is employed to filter non-stationary components of said audio signal.

12. A method for encoding a digital audio signal to generate a compressed output signal, said method comprising the steps of:

generating a plurality of noise threshold values as a function of the frequency characteristics of said digital signal;

alternatively filtering said digital signal by switching between a first filterbank and a wavelet filterbank to produce a filtered signal, said wavelet filterbank being a tree-structured non-uniform filterbank, said first filterbank being independent from said wavelet filterbank, and said switching occurring in response to the stationarity of said audio signal; and perceptually encoding said filtered signal to provide said compressed output signal.

13. The method of claim 12 wherein said first filterbank is a high frequency resolution MDCT filterbank.

14. An apparatus for encoding an audio signal, said apparatus comprising:

means for sampling said audio;

means for alternatively filtering said sampled audio signal by switching between a first filterbank and a wavelet filterbank to produce a filtered signal, said wavelet filterbank being a tree-structured non-uniform filterbank, said first filterbank being independent from said wavelet filterbank, and said switching occurring in response to the stationarity of said audio signal; and means for encoding said filtered signal to produce a compressed output signal.

15. The apparatus of claim 14 wherein said first filterbank is a high frequency resolution MDCT filterbank.

16. The apparatus of claim 15 wherein in said means for filtering, said stationarity is determined as a function of the perceptual entropy of said audio signal.

17. An apparatus for encoding an audio signal, said apparatus comprising:

means for generating a plurality of noise threshold values as a function of the frequency characteristics of said audio signal;

means for sampling said audio signal;

means for alternatively filtering said sampled audio signal by switching between a first filterbank and a wavelet filterbank to produce a filtered signal, said wavelet filterbank being a tree-structured non-uniform filterbank, said first filterbank being independent from said wavelet filterbank, and said switching occurring in response to the stationarity of said audio signal;

means for quantizing said filtered signal, the coarseness of said quantizing being controlled by said noise threshold values; and means for perceptually encoding said quantized signal.

18. An apparatus for processing a perceptually encoded audio signal, said perceptually encoded audio signal being produced by generating a plurality of noise threshold values as a function of the frequency characteristics of an input signal; sampling said input signal; alternatively filtering said sampled signal by switching between a first filterbank and a wavelet filterbank to produce a filtered signal, said wavelet filterbank being a tree-structured non-uniform filterbank, said first filterbank being independent from said wavelet filterbank, and said switching occurring in response to the stationarity of said input signal; quantizing said filtered signal, the coarseness of said quantizing being determined by said noise threshold values; perceptually encoding said quantized signal to produce said perceptually encoded audio signal; and applying said perceptually encoded audio signal to a communications channel, said apparatus comprising:

means for receiving said perceptually encoded audio signal from said communications channel;

means for decoding said received perceptually encoded audio signal; and means for recovering said input signal from said decoded audio signal.

19. The apparatus of claim 18 wherein said first filterbank is a high frequency resolution MDCT filterbank.

20. The apparatus of claim 19 wherein said stationarity is determined as a function of the level of perceptual entropy of said input signal.

* * * * *